United States Patent
Xiong et al.

(10) Patent No.: US 10,209,942 B2
(45) Date of Patent: Feb. 19, 2019

(54) COLLABORATIVELY DISPLAYING MEDIA CONTENT USING PLURALITY OF DISPLAY DEVICES

(71) Applicants: SONY CORPORATION, Tokyo (JP); SONY NETWORK ENTERTAINMENT INTERNATIONAL LLC, Los Angeles, CA (US)

(72) Inventors: True Xiong, San Diego, CA (US); Charles McCoy, Coronado, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 14/332,635

(22) Filed: Jul. 16, 2014

(65) Prior Publication Data

US 2016/0019018 A1 Jan. 21, 2016

(51) Int. Cl.
    *G06F 3/14* (2006.01)
(52) U.S. Cl.
    CPC ....... *G06F 3/1446* (2013.01); *G09G 2356/00* (2013.01)
(58) Field of Classification Search
    CPC .............................. G06F 3/1454; H04L 63/20
    See application file for complete search history.

(56) References Cited

U.S. PATENT DOCUMENTS

| 8,570,318 B2 | 10/2013 | Poornachandran et al. |
| 2008/0108323 A1* | 5/2008 | Abe ............ G06F 21/31 455/411 |
| 2008/0216125 A1* | 9/2008 | Li ............ H04N 13/0239 725/62 |
| 2010/0161742 A1* | 6/2010 | Haneda ........ G06Q 10/107 709/206 |
| 2011/0069081 A1* | 3/2011 | Lee ............ G06F 3/1438 345/593 |

(Continued)

FOREIGN PATENT DOCUMENTS

| EP | 1868078 A1 | 12/2007 |
| WO | 2005071530 A1 | 8/2005 |

OTHER PUBLICATIONS

Seb Lee-Delisle, "PixelPhones—a huge display made with smartphones", (http://seb.ly/2011/09/pixelphones-a-huge-display-made-with-smart-phones/), dated Sep. 17, 2011, pp. 1-12.

*Primary Examiner* — Shaheda Abdin
(74) *Attorney, Agent, or Firm* — Chip Law Group

(57) ABSTRACT

Various aspects of a system and a method for collaboratively displaying media content on multiple display devices comprises a plurality of display devices. A first display device of the plurality of display devices determines a portion of the media content to be displayed by the plurality of display devices, respectively. The portion of the media content is determined based on at least one parameter associated with the plurality of display devices. The first display device assigns at least a portion of a second display device of the plurality of display devices to display additional content. The portion of the second display device is determined based on the at least one parameter associated with the plurality of display devices.

22 Claims, 9 Drawing Sheets

(56) References Cited

U.S. PATENT DOCUMENTS

| | | | |
|---|---|---|---|
| 2012/0040720 A1* | 2/2012 | Zhang | H04M 1/7253 455/557 |
| 2012/0062442 A1* | 3/2012 | Locker | G06F 3/1446 345/1.3 |
| 2012/0242596 A1* | 9/2012 | Sip | G06F 3/04883 345/173 |
| 2012/0313968 A1* | 12/2012 | Yoshioka | G06F 3/1454 345/629 |
| 2013/0050063 A1* | 2/2013 | Poornachandran | H04L 63/20 345/2.1 |

* cited by examiner

COLLABORATIVELY DISPLAYING MEDIA CONTENT USING PLURALITY OF DISPLAY DEVICES

FIELD

Various embodiments of the disclosure relate to displaying media content. More specifically, various embodiments of the disclosure relate to collaboratively displaying media content on multiple display devices.

BACKGROUND

Recent advancements in display technology have made it possible to display media content on handheld and mobile display devices (such as smartphones, personal digital assistants (PDAs), and tablet computing devices). The display size of handheld and mobile display devices is often kept to a minimum to ensure portability of such display devices.

In certain scenarios, a user may want to create a large display screen by combining handheld display devices rather than display the media content on the single small screen of a solitary handheld device. However, handheld and mobile display devices may have limited capabilities to enable sharing of media content across various display devices. Moreover, in such scenarios, seamless display of the media content on the combined display may be interrupted by various tasks, such as displaying messages, social media notifications, incoming calls, and/or the like.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method are provided for collaboratively displaying media content substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various implementations may be found in a system and/or a method for collaboratively displaying media content on a plurality of display devices. Exemplary aspects of a method for collaboratively displaying media content may include a plurality of display devices. A first display device of the plurality of display devices may determine a portion of the media content to be displayed by the plurality of display devices. The portion may be determined based on at least one parameter associated with the plurality of display devices. The first display device may assign at least a portion of a second display device of the plurality of display devices to display additional content associated with the plurality of display devices. The portion of the second display device may be determined based on the at least one parameter associated with the plurality of display devices.

Exemplary aspects of a method for collaboratively displaying media content may include a plurality of display devices. A first display device of the plurality of display devices may dynamically determine change in position of at least one of the plurality of display devices. The first display device may dynamically render a portion of the media content to the plurality of display devices. The first display device may dynamically render the portion based on the determined change in the position. The first display device may assign at least a portion of a second display device of the plurality of display devices to display additional content. The first display device may assign the portion of the second display device based on the determined change in the position.

Exemplary aspects of a method for collaboratively displaying media content may include a computing device communicably connected to a plurality of display devices. The computing device may determine a portion of the media content to be displayed by the plurality of display devices. The computing device may determine the portion of the media content based on at least one parameter associated with the plurality of display devices. The computing device may assign at least a portion of one of the plurality of display devices to display additional content. The computing device may assign the portion of the one of the plurality of display devices based on the at least one parameter associated with the plurality of display devices.

Figure 1:
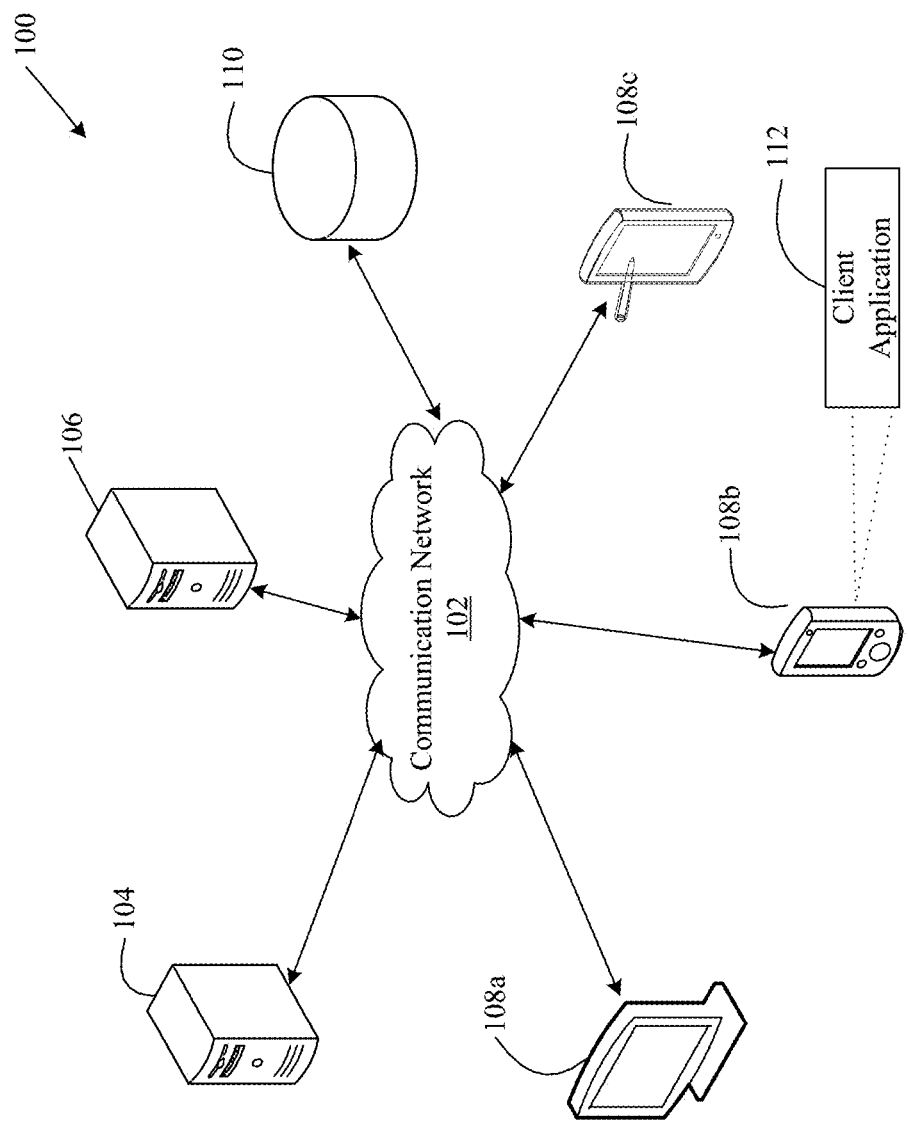
FIG. 1 is a block diagram illustrating a network environment for collaboratively displaying media content on multiple display devices, in accordance with an embodiment of the disclosure.

FIG. 1 is a block diagram of a network environment to collaboratively render media content to multiple display devices, in accordance with an embodiment of the disclosure. With reference to FIG. 1, there is shown a network 100. The network 100 may comprise a communication network 102, a content server 104, and a server computing device 106. The network 100 may further comprise one or more display devices, such as a first display device 108a, a second display device 108b, and a third display device 108c (collectively referred to as display devices 108), and a database 110. The display devices 108 may comprise a client application 112. Although FIG. 1 shows only three display devices (such as the display devices 108) for simplicity, one skilled in the art may appreciate that the implementation of disclosed embodiments may occur for two or more number of display devices.

The communication network 102 may comprise a medium through which the content server 104, the server computing device 106, the display devices 108, and/or a television broadcast station (not shown) may communicate with each other. Examples of the communication network 102 may include, but are not limited to, the Internet, a Wireless Fidelity (Wi-Fi) network, a Wireless Local Area Network (WLAN), a Local Area Network (LAN), a telephone line (POTS), and/or a Metropolitan Area Network (MAN). Various devices in the network 100 may be operable to connect to the communication network 102, in accordance with various wired and wireless communication protocols Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

The content server 104 may comprise suitable logic, circuitry, interfaces, and/or code that may be operable to provide a media content for use by the server computing device 106 and the display devices 108. The media content may correspond to a continuous sequence of audio, video, text, image, animation, and/or a combination thereof. The media content may include content, such as news, information and entertainment, and/or leisure activities. Further, the content server 104 may provide additional content associated with the display devices 108. Examples of the additional content associated with the display devices 108 may include, but are not limited to, incoming calls, messages, notifications, and/or alerts received by the display devices 108.

The content server 104 may further comprise a storage device, and/or multiple storage devices distributively connected that maintain a repository of the media content provided by the content server 104. Examples of the content server 104 may include, but are not limited to, television networks, on-demand content providers, independent content provider companies, e-mail service providers, and/or social media service providers. The content server 104 may transmit the media content to the server computing device 106 and the display devices 108, via the communication network 102.

The server computing device 106 may comprise suitable logic, circuitry, interfaces, and/or code that may be operable to host a set of applications to collaboratively render the media content on demand on the display devices 108. Further, the server computing device 106 may be operable to provide the additional content associated with the display devices 108 to the display devices 108.

The server computing device 106 may be implemented as a cluster or network of computing devices configured to jointly perform the functions of the server computing device 106. The server computing device 106 may optionally comprise storage media for storing the media content. The server computing device 106 may be an electronic device with or without display capabilities. When the server computing device 106 has display capabilities, the server computing device 106 may display the media content as part of the collaborative display arrangement of the display devices 108.

In an embodiment, the content server 104 may be combined with the server computing device 106. In such an embodiment, the server computing device 106 may be operable to manage operations of both the content server 104 and the server computing device 106. Further, in such an embodiment, the server computing device 106 may store content associated with both the content server 104 and the server computing device 106.

The display devices 108 may comprise suitable logic, circuitry, interfaces, and/or code that may be operable to display the media content and the additional content. Examples of the display devices 108 may include, but are not limited to, a smart phone, a touch screen device, a laptop, a tablet computer, a television, and/or a personal digital assistant (PDA) device. The display devices 108 may communicate with the content server 104, and/or the server computing device 106, via the communication network 102. In an embodiment, the display devices 108 may be operable to receive the media content and/or the additional content from the content server 104, the server computing device 106, and/or a television broadcast station (not shown). Further, in an embodiment, the media content may be stored locally in a storage device associated with the display devices 108. In an embodiment, the display devices 108 may be operable to receive media content stored in the database 110, via the communication network 102.

The database 110 may comprise suitable logic, circuitry, interfaces, and/or code that may be operable to store the media content associated with the content server 104, the server computing device 106, and/or the display devices 108, and/or any other data. In an embodiment, the database 110 may connect to the content server 104, and/or the server computing device 106, via the communication network 102. In an embodiment, the database 110 may be integrated with either or both of the content server 104 and the server computing device 106. The database 110 may communicate with the display devices 108, via the communication network 102. The database 110 may be implemented by using several technologies that are well known to those skilled in the art.

A user may install the client application 112 on the display devices 108. The client application 112 may enable the display devices 108 to communicate with each other, with the content server 104, and/or with the server computing device 106. Further, the client application 112 may enable media content to be collaboratively rendered to the display devices 108. The client application 112 may further enable display of additional content on the display devices 108.

In operation, the display devices 108 may be operable to collaboratively render media content and to display additional content associated with the display devices 108. In an embodiment, the display devices 108 may be arranged in a manner to form a collaborative display (hereinafter referred to as a collaborative display arrangement). Further, in various embodiments, the display devices 108 may be arranged in a variety of positions to form multiple possible arrangements as desired by a user. Each of the first display device 108a, the second display device 108b, and the third display device 108c, may receive a first portion, a second portion and a third portion of the media content, respectively. The first display device 108a, the second display device 108b and the third display device 108c may collaboratively display the received first portion, the received second portion and the received third portion of the media content.

The server computing device 106 or a display device of the display devices 108 may be designated as a master device. A master device designation may be based on one or more criteria, including, but not limited to, designation by a user, configuration information of display devices 108, connectivity to the communication network 102, and/or access to the media content. A master device may control communication among the display devices 108. Further, a master device may control communication of the display devices 108 with the server computing device 106, and/or the content server 104.

In an embodiment, the server computing device 106 may be designated as a master device and the display devices 108 may be designated as slave devices. In such a case, the server computing device 106 may not be a part of the collaborative display arrangement. The server computing device 106 may not display media content but may control the display devices 108 of the collaborative display arrangement to display media content and/or additional content.

In an embodiment, a display device of the display devices 108 may be designated as a master device while the remaining display devices may be designated as slave devices. In an embodiment, the master device may be a part of a collaborative display arrangement such that the master device may display media content along with other display devices of the collaborative display arrangement. In an embodiment, the master device may not display media content in a collaborative display arrangement, but may control display devices which are part of the collaborative display arrangement.

The master device may select media content to be collaboratively rendered to the display devices 108. In an embodiment, the master device may retrieve the selected media content from the server computing device 106, and/or the content server 104, via the communication network 102. In an embodiment, the selected media content may be stored locally on the master device. In an embodiment, the master device may retrieve the selected media content from one or more slave devices.

The master device may determine a portion of the media content to be rendered to the display devices 108. The master device may transmit the determined portion of the media content to the respective display device via the communication network 102. The master device may determine the portion of the media content based on at least one parameter associated with the display devices 108. The at least one parameter associated with the display devices 108 may include, but are not limited to, configuration information of each of the display devices 108, relative position of each of the display devices 108 in the collaborative display arrangement, and/or user credentials of one or more accounts associated with each of the display devices 108.

In an embodiment, the master device, such as the first display device 108a, may determine the position of the display devices 108 in the collaborative display arrangement. The master device may also dynamically determine a change in position of at least one of the display devices 108 in the collaborative display arrangement. The master device may provide a unique portion of media content to each of the display devices 108 in the collaborative arrangement, based on the position of each of the display devices 108 in the collaborative arrangement. When the position of the at least one of the display devices 108 changes in the collaborative arrangement, the master device may change the portion of the media content provided to the display devices 108. The portion of the media content may be changed, based on the change in position of at least one of the display devices 108.

In an embodiment, the master device may assign at least a portion of a display screen of one or more of the display devices 108 to display additional content associated with the display devices 108. A portion of a display screen is assigned based on at least one parameter associated with the display devices 108. In an embodiment, the master device may assign an entire display screen of one or more of the display devices 108 to display additional content.

Figure 2:
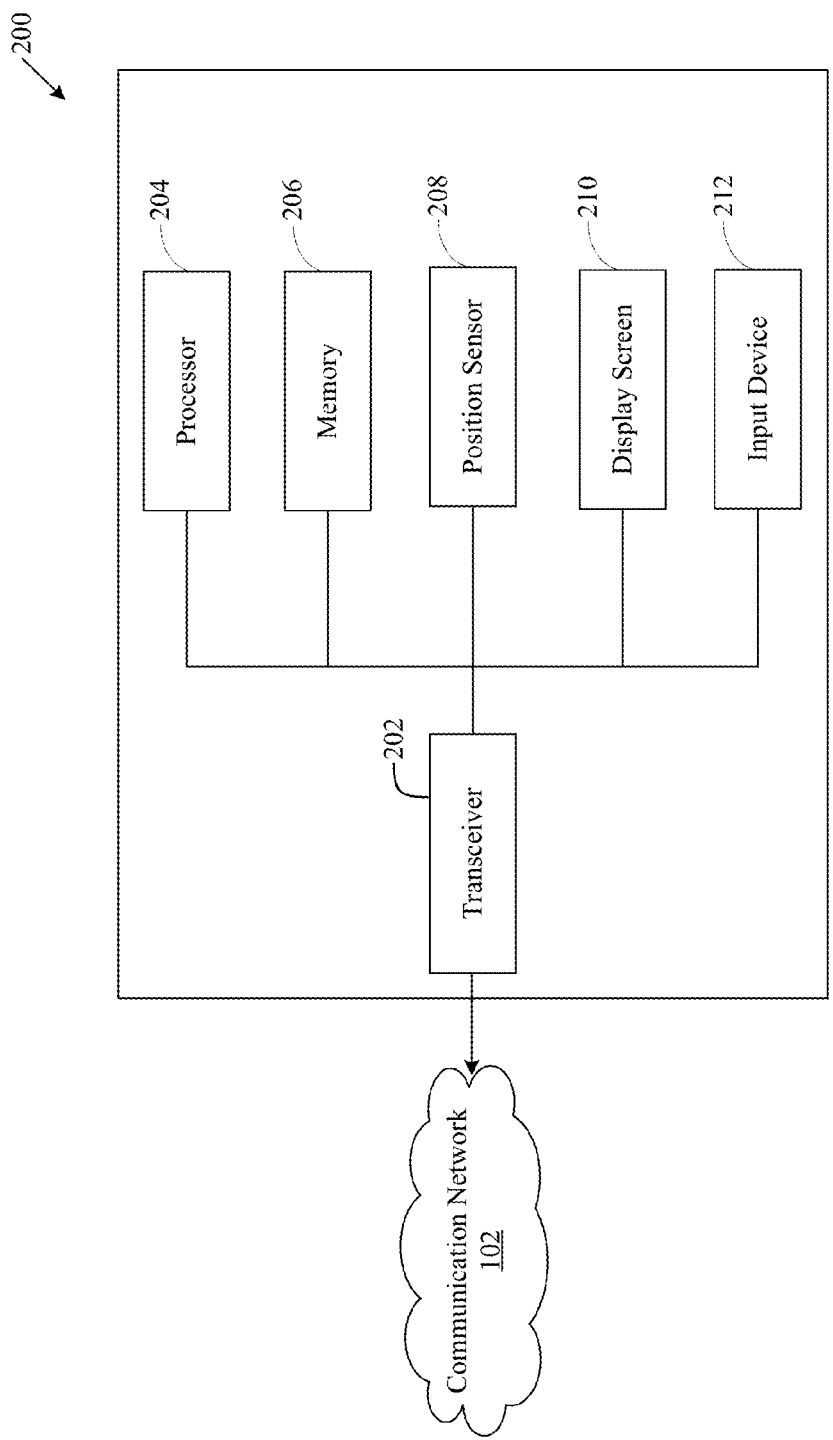
FIG. 2 is a block diagram illustrating an exemplary display device, in accordance with an embodiment of the disclosure.

FIG. 2 is a block diagram illustrating a display device, in accordance with an embodiment of the disclosure. FIG. 2 is explained in conjunction with elements from FIG. 1. With reference to FIG. 2, there is shown a first display device 108a. Although a display device shown in FIG. 2 corresponds to the first display device 108a, the disclosure is not so limited. A display device of FIG. 2 may also correspond to the second display device 108b and the third display device 108c without limiting the scope of the disclosure.

The first display device 108a may comprise a transceiver 202, one or more processors, such as a processor 204, a memory 206, a position sensor 208, a display screen 210, and an input device 212. The processor 204 may be communicatively coupled to the transceiver 202, the memory 206, and the position sensor 208. Further, the processor 204 may be communicatively coupled to the display screen 210 and the input device 212.

The transceiver 202 may comprise suitable logic, circuitry, interfaces, and/or code that may be operable to communicate with other display devices, such as the second display device 108b, and/or the third display device 108c, the content server 104, the server computing device 106, and/or the television broadcast station (not shown), via various communication interfaces. The transceiver 202 may implement known technologies for supporting wired or wireless communication with the communication network 102. The transceiver 202 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a memory. The transceiver 202 may communicate via wireless communication with networks, such as the Internet, an Intranet, and/or a wireless network. Examples of a wireless network may include, but are not limited to, a cellular telephone network, a wireless local area network (LAN), and/or a metropolitan area network (MAN). The wireless communication may use any communication standards, protocols, and/or technologies including, but not limited to, Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g, and/or IEEE 802.11n), voice over Internet Protocol (VoIP), Wi-MAX, a protocol for email, instant messaging, and/or Short Message Service (SMS).

The processor 204 may comprise suitable logic, circuitry, interfaces, and/or code that may be operable to execute a set of instructions stored in the memory 206. The processor 204 may be implemented based on a number of processor technologies known in the art. Examples of the processor 204 may be an X86-based processor, a Reduced Instruction Set Computing (RISC) processor, an Application-Specific Integrated Circuit (ASIC) processor, a Complex Instruction Set Computing (CISC) processor, and/or any other processor.

The memory 206 may comprise suitable logic, circuitry, and/or interfaces that may be operable to store a machine code and/or a computer program having at least one code section executable by the processor 204. The memory 206 may further store at least one code section associated with the position sensor 208. The memory 206 may further store information associated with the first display device 108a. Examples of such information associated with the first display device 108a may include, but are not limited to, configuration information of the first display device 108a, profile of a user associated with the first display device 108a, and/or user credentials of one or more accounts associated with the first display device 108a. The memory 206 may further store at least one code section associated with one or more applications installed on the first display device 108a. Examples of such one or more applications may include, but are not limited to, the client application 112, a social networking application, a web browser application, games-based applications, and/or music-based applications. Examples of such one or more applications may further include, but are not limited to, one or more communication applications, such as an e-mail application and/or a text chat application. Examples of implementation of the memory 206 may include, but are not limited to, Random Access Memory (RAM), Read Only Memory (ROM), Hard Disk Drive (HDD), and/or a Secure Digital (SD) card.

The memory 206 may comprise a media content data-store. The media content data-store may store media content that may be displayed on the display devices 108. Such a media content data-store may be communicatively coupled with a secondary storage device, for example, a hard disk, and/or an external storage device, such as a compact disc (CD). Such a communicative coupling may enable the media content data-store to buffer media content retrieved from the secondary storage device and/or the external storage device. The media content data-store may be implemented by the use of various media content database management systems that are well known to those skilled in the art.

The position sensor 208 may comprise suitable logic, circuitry, interfaces, and/or code that may be operable to determine relative and/or absolute position of the first display device 108a in a collaborative display arrangement. The position sensor 208 may be operable to transmit and/or receive signals to/from nearby display devices.

The position sensor 208 may determine relative and/or absolute position of the first display device 108a based on one or more of: round trip time, signal strength, time difference of arrival, and/or angle of arrival of the signal(s) transmitted and/or received by the position sensor 208. In various other embodiments, the position sensor 208 may be configured to determine relative position, and/or absolute position of the first display device 108a, in the arrangement of the display devices 108, based on various positioning systems. Examples of such positioning systems may include, but are not limited to, Global Positioning System (GPS), WiFi-based positioning systems, cellular telephony-based positioning systems, Bluetoothh™-based positioning systems, and/or triangulation system, the details of which can be appreciated by one skilled in the art.

In an embodiment, the position sensor 208 may occur as a group of sensors located at various positions of the first display device 108a.

The display screen 210 may comprise suitable logic, circuitry, interfaces, and/or code that may be operable to display a graphical user interface (GUI) associated with the first display device 108a. The display screen 210 may be realized through several known technologies such as, but not limited to, Liquid Crystal Display (LCD) based display, Light Emitting Diode (LED) based display, and/or Organic LED (OLED) display technology. Further, the display screen 210 may be a touch screen that may receive input from a user.

The input device 212 may comprise suitable logic, circuitry, interfaces, and/or code that may be operable to receive input from a user. Examples of the input device 212 may include, but are not limited to, a keypad, a stylus, and/or a touch screen.

In operation, a user may launch the client application 112 by providing an input signal to the first display device 108a, via the input device 212. In response to the received input signal, the processor 204 may initiate the client application 112, to collaboratively render media content to the display devices 108. Based on initiation of the client application 112, the processor 204 may scan for one or more display devices in proximity to the first display device 108a. Proximity may correspond to a range of operational distances of a communication protocol used by the first display device 108a, to communicate with other display devices. Various examples of the communication protocols used by the first display device 108a may include, but are not limited to, Bluetooth (BT), Near Field Communication (NFC), Wireless Fidelity (Wi-Fi), Infrared (IR), and/or Zigbee. Based on the scanning, the processor 204 may detect one or more other display devices in proximity to the first display device 108a. For example, the processor 204 may detect the second display device 108b and the third display device 108c, in proximity to the first display device 108a. The transceiver 202 may transmit a communication request to the second display device 108b and the third display device 108c via the communication network 102. Based on the communication request, communication may be established between the first display device 108a, the second display device 108b and the third display device 108c. The communication between the first display device 108a, the second display device 108b, and the third display device 108c, may be initiated and established using any communication technique without limiting the scope of the disclosure.

After communication is established, one of the display devices 108 may be designated as a master device. Display devices other than the master device may be designated as slave devices. A master device may control collaborative rendering of media content and display of additional content on the display devices 108. Slave devices may receive information required to render respective portions of media content and display additional content from a master device.

In an embodiment, a master device may be dynamically designated based on configuration information of the display devices 108. For example, one of the display devices 108, with graphics rendering capabilities higher than other display devices 108, may be designated as a master device. In such an embodiment, a display device of the display devices 108 may receive configuration information from the other display devices. In an embodiment, the display device that initiates communication with other display devices may receive configuration information of the other display devices. In such a case, the display device may receive the configuration information from the respective display devices. For example, the first display device 108a may receive configuration information of the second display device 108b from the second display device 108b. Further, the first display device 108a may receive configuration information of the third display device 108c from the third display device 108c. The processor 204 may receive configuration information from the second display device 108b, and the third display device 108c, via the transceiver 202. The processor 204 may store the received configuration information of the second display device 108b, and the third display device 108c, in the memory 206. The processor 204 may compare the configuration information of the display devices 108. The processor 204 may designate one of the display devices 108 as master device based on the comparison. Notwithstanding, the disclosure may not be so limited and any of the display devices 108 may be designated as a master device without limiting the scope of the disclosure.

In an embodiment, a display device of the display devices 108, on which the client application 112 is initiated (for example, the first display device 108a), may be designated as a master device. Remaining display devices (for example, the second display device 108b and the third display device 108c) may be designated as slave devices.

In an embodiment, a user that launched the client application 112 may designate one of the display devices 108 as a master device. In an embodiment, one of the display devices 108, which has access to media content, may be designated as a master device. For example, a display device that has access to an on-demand Internet streaming media service provider may be designated as a master device.

In an embodiment, one of the display devices 108, which has media content stored locally, may be designated as a master device. In an embodiment, one of the display devices 108, which has connectivity to the communication network 102, may be designated as a master device.

In an embodiment, the first display device 108a may be designated as a master device. The second display device 108b and the third display device 108c may be designated as slave devices. Notwithstanding, the disclosure may not be so limited and any of the display devices 108 may be a master device or a slave device without limiting the scope of the disclosure.

In an embodiment, the processor 204 may receive configuration information and position information associated with the second display device 108b, from the second display device 108b. Further, the processor 204 may receive configuration information and position information associated with the third display device 108c, from the third display device 108c. The position information may indicate position of the second display device 108b and the third display device 108c, in the collaborative display arrangement. The processor 204 may store the received configuration information and the position information in the memory 206. In an embodiment, the configuration information associated with the second display device 108b and the third display device 108c may be stored previously in the memory 206.

The processor 204 may determine one or more common rendering capabilities of the display devices 108. The processor 204 may determine the one or more common rendering capabilities based on the configuration information of the display devices 108. The one or more common rendering capabilities may include, but are not limited to; various file formats, screen resolution, and/or various resolutions of media content that may be supported by each of the display devices 108. For example, the processor 204 may determine a media content resolution common for the display devices 108. The processor 204 may determine the common media content resolution based on various resolutions of media content supported by each of the display devices 108.

Based on the determined one or more common rendering capabilities, the processor 204 may determine one or more quality parameters of media content to be collaboratively rendered to the display devices 108. Examples of the quality parameters may include, but are not limited to, file format, and/or resolution of media content to be collaboratively rendered on the display devices 108.

The processor 204 may determine position information associated with the first display device 108a, based on one or more signals provided by the position sensor 208. The processor 204 may determine relative position of the display devices 108, in the collaborative display arrangement. The processor 204 may determine the relative position based on the position information associated with the respective display devices 108.

The processor 204 may determine media content to be collaboratively rendered to the display devices 108. In an embodiment, the processor 204 may present a user interface through which a user may select media content to be collaboratively rendered to the display devices 108. A user may be associated with any of the display devices 108. A user interface may provide options to a user to select media content to be collaboratively rendered to the display devices 108.

In an embodiment, a user may select media content to be collaboratively rendered to the display devices 108, from media content stored locally on one of the display devices 108. For example, a user may select media content stored locally on the second display device 108b. In such a case, the processor 204 may retrieve the selected media content from the second display device 108b, via the communication network 102. The processor 204 may store the retrieved media content in the memory 206.

In an embodiment, the processor 204 may provide an option to a user to select media content from the content server 104, and/or the server computing device 106. For example, the processor 204 may provide an option to a user to select media content from an online content service provider. In such an embodiment, the processor 204 may provide a user interface for a user to provide user credentials associated with the online content service provider.

In an embodiment, a user may select media content from the server computing device 106. The processor 204 may transmit information associated with the media content to be rendered collaboratively on the display devices 108, to the server computing device 106. In an embodiment, the processor 204 may transmit an identifier associated with the media content to the server computing device 106. Examples of such identifiers may include, but are not limited to, title, file format, source, and/or any other associated metadata.

Additionally, the processor 204 may transmit at least one parameter associated with the respective display devices 108, to the server computing device 106 via the communication network 102. In an embodiment, the display devices 108 may individually transmit at least one parameter associated with them to the server computing device 106, via the communication network 102. The at least one parameter may include, but is not limited to, configuration information and/or relative position of each of the display devices 108, and/or user credentials of one or more accounts associated with each of the display devices 108. The configuration information may include, but is not limited to, screen resolution information, supported media formats, supported media resolutions, residual energy capacity, workload, graphics processing resources, and/or other processing resources.

In an embodiment, the processor 204 may transmit information associated with one or more common rendering capabilities of the display devices 108, to the server computing device 106. The processor 204 may further transmit one or more quality parameters associated with media content to the server computing device 106. In an embodiment, the server computing device 106 may determine one or more common rendering capabilities of the display devices 108, based on configuration information received from the processor 204. The server computing device 106 may determine one or more quality parameters of media content based on the determined one or more common rendering capabilities. The server computing device 106 may transmit the media content to the first display device 108a, via the communication network 102. The processor 204 may receive the media content via the transceiver 202. The processor 204 may store the received media content in the memory 206.

The processor 204 may determine portions of media content to be rendered to each of the display devices 108.

The processor 204 may determine the portions based on the determined relative positions and configuration information of the display devices 108. For example, dimension of portions of the selected media content for each of the display devices 108, may be determined based on screen resolution of the respective display devices 108.

In an embodiment, the processor 204 may transmit portions of the selected media content associated with the second display device 108b, and the third display device 108c to the second display device 108b, and the third display device 108c, respectively. The processor 204 may transmit the portions of the media content to the second display device 108b, and the third display device 108c via the transceiver 202. The second display device 108b, and the third display device 108c, may store the received portion of media content in a memory associated with the second display device 108b, and the third display device 108c, respectively. The display screen 210 and a display screen associated with the second display device 108b, and the third display device 108c, may display the respective portion of media content.

In an embodiment, the processor 204 may transmit information associated with the determined portions of the media content to the second display device 108b and the third display device 108c, via the transceiver 202. The information associated with the determined portions of the media content may include, but is not limited to, file name of the media content, source information of the media content, and/or dimensions of the determined portions of the media content. The source information of the media content may include, but is not limited to, a URL, access credential information (if any) associated with the media content, and/or a file path name.

The second display device 108b, and the third display device 108c, may render the determined portions of the media content based on the information associated with the media content received from the first display device 108a. The second display device 108b, and the third display device 108c, may retrieve the portion of the media content based on the source information of the media content. Further, the second display device 108b, and the third display device 108c, may display the respective retrieved portions of the media content on a respective display screen.

In an embodiment, the processor 204 may assign a portion of a display screen of one or more of the display devices 108, to display additional content associated with the display devices 108, during collaborative rendering of the media content. The processor 204 may assign a portion of the display screen to display the additional content based on the configuration information and relative position of the display devices 108.

In an embodiment, the processor 204 may assign a portion of display screen of one or more of the display devices 108, in a manner that provides unobstructed collaborative display of the media content on the display devices 108. In an embodiment, the processor 204 may assign a portion of a display screen of one or more of the display devices 108, based on a user input.

When media content is collaboratively rendered on the display devices 108, the processor 204 may detect additional content associated with any of the display devices 108. In an embodiment, each display device of the collaborative display arrangement may detect an additional content associated with it. When any display device detects the associated additional content, the display device may transmit a signal to the processor 204. The processor 204 may detect the additional content based on the received signal.

The processor 204 may provide the detected additional content to a display device for which a portion of display screen is assigned to display the additional content. The additional content may then be displayed on the assigned portion of the display screen.

In an embodiment, the processor 204 may assign more than one portion of display screen of one or more of the display devices 108 to display additional content. In an embodiment, the processor 204 may assign a portion of display screen of a display device to display a specific type of additional content. For example, the processor 204 may assign a portion of a display screen of the second display device 108b, to display the incoming call screen associated with any of the display devices 108. Similarly, the processor 204 may assign a portion of a display screen of the third display device 108c, to display email notification associated with any of the display devices 108. In such a case, during the collaborative display, when the processor 204 detects an incoming call associated with the third display device 108c, the processor 204 may display an incoming call screen on a portion of the display screen of the second display device 108b. Similarly, during the collaborative display, when the processor 204 detects that an email is received by the first display device 108a, the processor 204 may display an email notification on a portion of display screen of the third display device 108c. Notwithstanding, the disclosure may not be so limited and any of the display devices 108 may be assigned to display any additional content without limiting the scope of the disclosure.

In an embodiment, the processor 204 may assign the entire display screen of one or more of the display devices 108 to display additional content. For example, the processor 204 may assign the entire display screen of the second display device 108b to display a message received by any of the display devices 108. Similarly, the processor 204 may assign the entire display screen of the first display device 108a to display an incoming call screen of any of the display devices 108.

In an embodiment, the processor 204 may dynamically change portions of media content associated with the respective display devices 108, when additional content is to be displayed on one or more of the display devices 108.

In an embodiment, the processor 204 may maintain a centralized cache in the memory 206. The processor 204 may store user credentials of one or more accounts and applications associated with the respective display devices 108, in the centralized cache. The processor 204 may pull notifications associated with the one or more accounts and/or applications based on the stored user credentials. The processor 204 may display the notifications on an assigned portion of display screen.

In an embodiment, the processor 204 may dynamically determine a change in relative position of the display devices 108, in the collaborative display arrangement. In such an embodiment, the processor 204 may dynamically change portions of the media content to be rendered to each of the display devices 108, based on the determined change in relative position. Further, the processor 204 may dynamically change a portion of display screen of one or more of the display devices 108 to display the additional content, based on the determined change in relative position.

In an embodiment, the processor 204 may detect an additional display device in proximity of a collaborative display arrangement. For example, a new display device, different from the display devices 108, may be added to the collaborative display arrangement. In an embodiment, the processor 204 may detect an additional display device based on a signal received from the additional display device. The processor 204 may establish communication with the additional device.

In such an embodiment, the transceiver 202 may receive at least one parameter associated with the additional display device from the additional display device. The processor 204 may dynamically determine one or more common rendering capabilities of the display devices 108, and the additional display device, based on the received at least one parameter associated with the additional display device. The processor 204 may dynamically determine one or more quality parameters of media content based on one or more common rendering capabilities of the display devices 108, and the additional display device. Further, the processor 204 may dynamically determine relative position of the display devices 108, and the additional display device. Based on the determined relative position of the display devices 108 and the additional display device, the processor 204 may dynamically determine portions of media content to be rendered to the display devices 108 and the additional display device. Further, the processor 204 may dynamically assign a portion of display screen of one or more of the display devices 108 or the additional display device to display additional content.

In an embodiment, one or more of the display devices 108 may no longer be available to collaboratively render media content. This may occur when a display device is removed from a collaborative display arrangement and/or switched off. This may also occur when a master device is not able to detect a display device in proximity.

In an embodiment, the processor 204 may determine that a display device of the collaborative display arrangement is no longer available. The processor 204 may clear user credentials of various accounts and applications associated with the unavailable display device from the centralized cache in the memory 206.

Additionally, when one or more of the display devices 108 are unavailable in a collaborative display arrangement, the relative position of display devices that remain in the collaborative display arrangement may change. The processor 204 may dynamically determine that one or more display devices are unavailable and/or the positions of the remaining display devices have been changed. In response, the processor 204 may dynamically change portions of media content to be rendered on each of the display devices that remain in the collaborative display arrangement. The processor 204 may change portions of media content based on the change in relative position. Further, the processor 204 may dynamically assign a portion of a display screen of one or more of the remaining display devices to display additional content.

In an embodiment, the processor 204 may determine a change in one or more common rendering capabilities of the display devices that remain in the collaborative display arrangement. The processor 204 may determine one or more quality parameters of media content based on a change in one or more common rendering capabilities of the display devices that remain in the collaborative display arrangement. For example, power of the third display device 108c may be switched off. In such a case, the processor 204 may not be able to detect the third display device 108c. Thus, the processor 204 may determine that the third display device 108c is not available to collaboratively render media content. The processor 204 may dynamically determine a change in the relative position of the first display device 108a, and the second display device 108b, that remain in the collaborative display arrangement. The processor 204 may dynamically change portions of the media content to be rendered to the first display device 108a, and the second display device 108b. Further, the processor 204 may dynamically assign a portion of a display screen of the first display device 108a, and/or the second display device 108b, to display additional content associated with the first display device 108a, and/or the second display device 108b.

Although the disclosure has been described with the first display device 108a as a master device, and the second display device 108b, and the third display device 108c as slave devices, one skilled in the art may appreciate that the disclosure can be implemented with any of the display devices as the master device and the slave device without limiting the scope of the disclosure.

Although the disclosure has been described with a master device (such as the first display device 108a) as a part of the collaborative display arrangement such that the master device may display media content, the disclosure may not be so limited. The disclosure may be implemented in a manner such that the master device may not display media content, but may be operable to perform functions of the master device as described above. In such an implementation, the master device may correspond to one of the display devices 108 or the server computing device 106.

Figure 3:
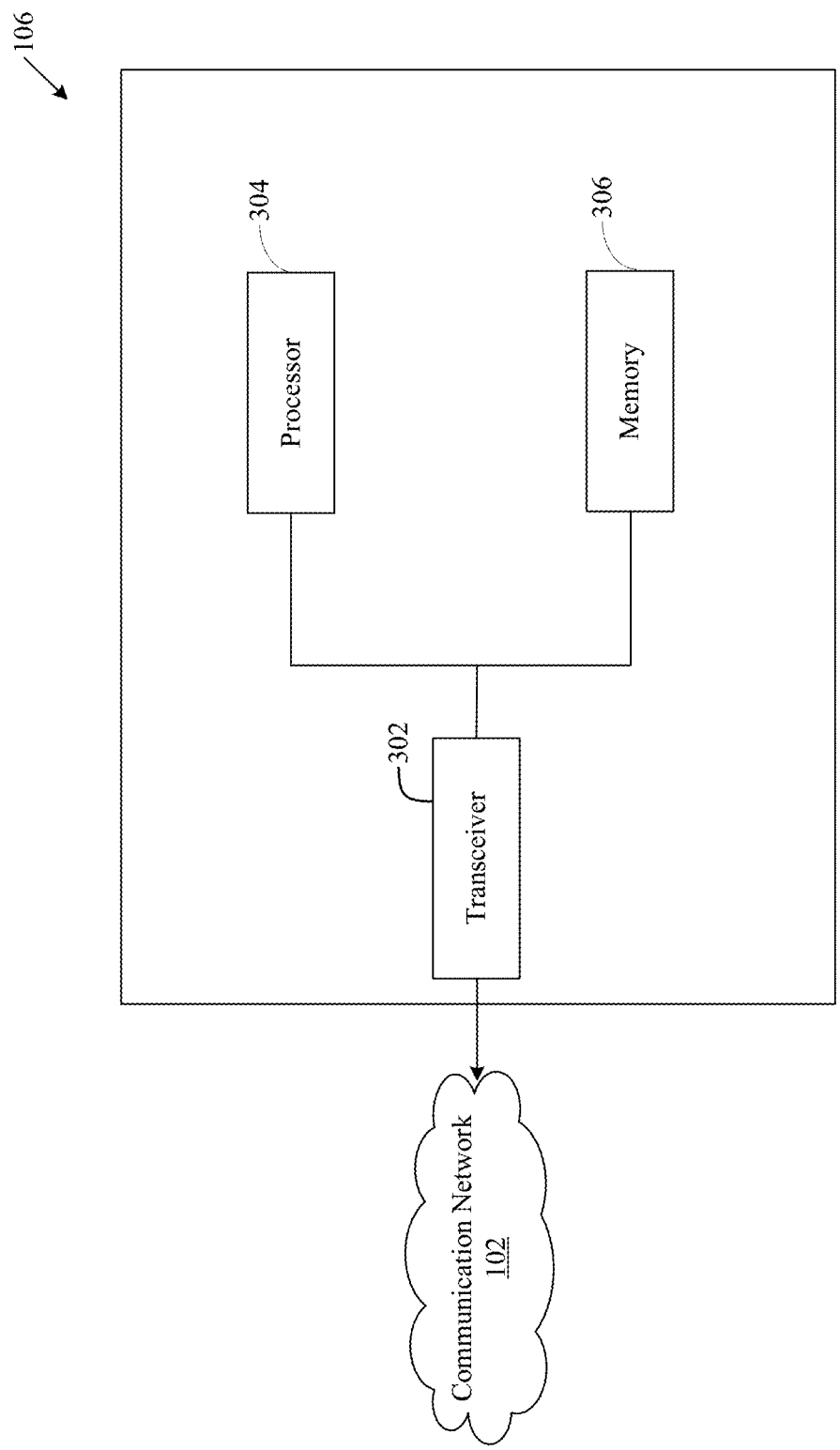
FIG. 3 is a block diagram illustrating an exemplary server computing device, in accordance with an embodiment of the disclosure.

FIG. 3 is a block diagram illustrating a server computing device, in accordance with an embodiment of the disclosure. FIG. 3 is explained in conjunction with elements from FIG. 1 and FIG. 2. With reference to FIG. 3, there is shown the server computing device 106. The server computing device 106 may comprise a transceiver 302, one or more processors, such as a processor 304, and a memory 306.

The processor 304 may be communicatively coupled to the transceiver 302 and the memory 306.

The transceiver 302 may comprise suitable logic, circuitry, interfaces, and/or code that may be operable to communicate with the content server 104, the display devices 108, the database 110, and/or the television broadcast station (not shown), via various communication interfaces. The transceiver 302 may implement known technologies for supporting wired or wireless communication with the communication network 102. The transceiver 302 may include, but not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a memory. The transceiver 302 may communicate via wireless communication with networks, such as the Internet, an Intranet, and/or a wireless network. Examples of such wireless networks may include, but are not limited to, a cellular telephone network, a wireless local area network (LAN), and/or a metropolitan area network (MAN).

The wireless communication may use any communication standards, protocols and technologies including, but not limited to, Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g, and/or IEEE 802.11n), voice over Internet Protocol (VoIP), Wi-MAX, a protocol for email, instant messaging, and/or Short Message Service (SMS).

The processor 304 may comprise suitable logic, circuitry, interfaces, and/or code that may be operable to execute a set of instructions stored in the memory 306. The processor 304 may be implemented based on a number of processor technologies known in the art. Examples of the processor 304 may be an X86-based processor, a Reduced Instruction Set Computing (RISC) processor, an Application-Specific Integrated Circuit (ASIC) processor, a Complex Instruction Set Computing (CISC) processor, and/or any other processor.

The memory 306 may comprise suitable logic, circuitry, interfaces, and/or code that may be operable to store the received set of instructions. The memory 306 may be implemented based on, but not limited to, a Random Access Memory (RAM), a Read-Only Memory (ROM), a Hard Disk Drive (HDD), a storage server, and/or a Secure Digital (SD) card.

The memory 306 may comprise a media content data-store. The media content data-store may be operable to store one or more media content that may be rendered to the display devices 108. Such a media content data-store may be communicatively coupled with a secondary storage device, for example, a hard disk or external storage device, such as a compact disc (CD). Such a communicative coupling may enable the media content data-store to buffer media content retrieved from the secondary storage device and/or the external storage device. The media content data-store may be implemented by the use of various media content database management systems that are well known to those skilled in the art.

In operation, the server computing device 106 may be designated as a master device. The display devices 108 may be designated as slave devices. The server computing device 106 may be operable to control collaborative display of media content on the display devices 108. The server computing device 106 may determine a portion of the media content to be rendered to the display devices 108. Further, the server computing device 106 may assign at least a portion of a display screen of one or more of the display devices 108 to display additional content associated with the display devices 108.

In an embodiment, the server computing device 106 may perform various operations of a master device to collaboratively render the multimedia content on the display devices 108 which are part of the collaborative display arrangement, as described above with regard to the master device in FIG. 2.

Although the disclosure has been described with the server computing device 106 as a master device, the disclosure may not be so limited. In an embodiment, one of the display devices 108 may act as a master device to control collaborative rendering of media content on the display devices 108. In such an embodiment, the server computing device 106 may communicate with a master device from the display devices 108, via the communication network 102.

The processor 304 may receive information associated with one or more common rendering capabilities of the display devices 108, from the master device. The processor 204 may further receive one or more quality parameters associated with the media content from the master device. In an embodiment, the processor 304 may determine the media content based on information associated with the media content received from the master device. The processor 304 may transmit the media content to the master device via the communication network 102.

FIGS. 4, 5, 6, 7, and 8 illustrate examples of collaboratively rendering media content on the display devices 108, in accordance with various embodiments of the disclosure. The examples of FIGS. 4, 5, 6, 7, and 8 are explained in conjunction with the elements of FIG. 1, FIG. 2 and FIG. 3.

With reference to FIGS. 4, 5, 6, 7, and 8, there is shown a collaborative display arrangement of the display devices 108. The display devices 108 are arranged in a manner to form a collaborative display. The display devices 108 may be arranged at various positions in the collaborative display arrangement as desired by a user.

FIGS. 4, 5, 6, 7, and 8 further show a media content to be collaboratively rendered by the display devices 108, and additional content.

Figure 4:
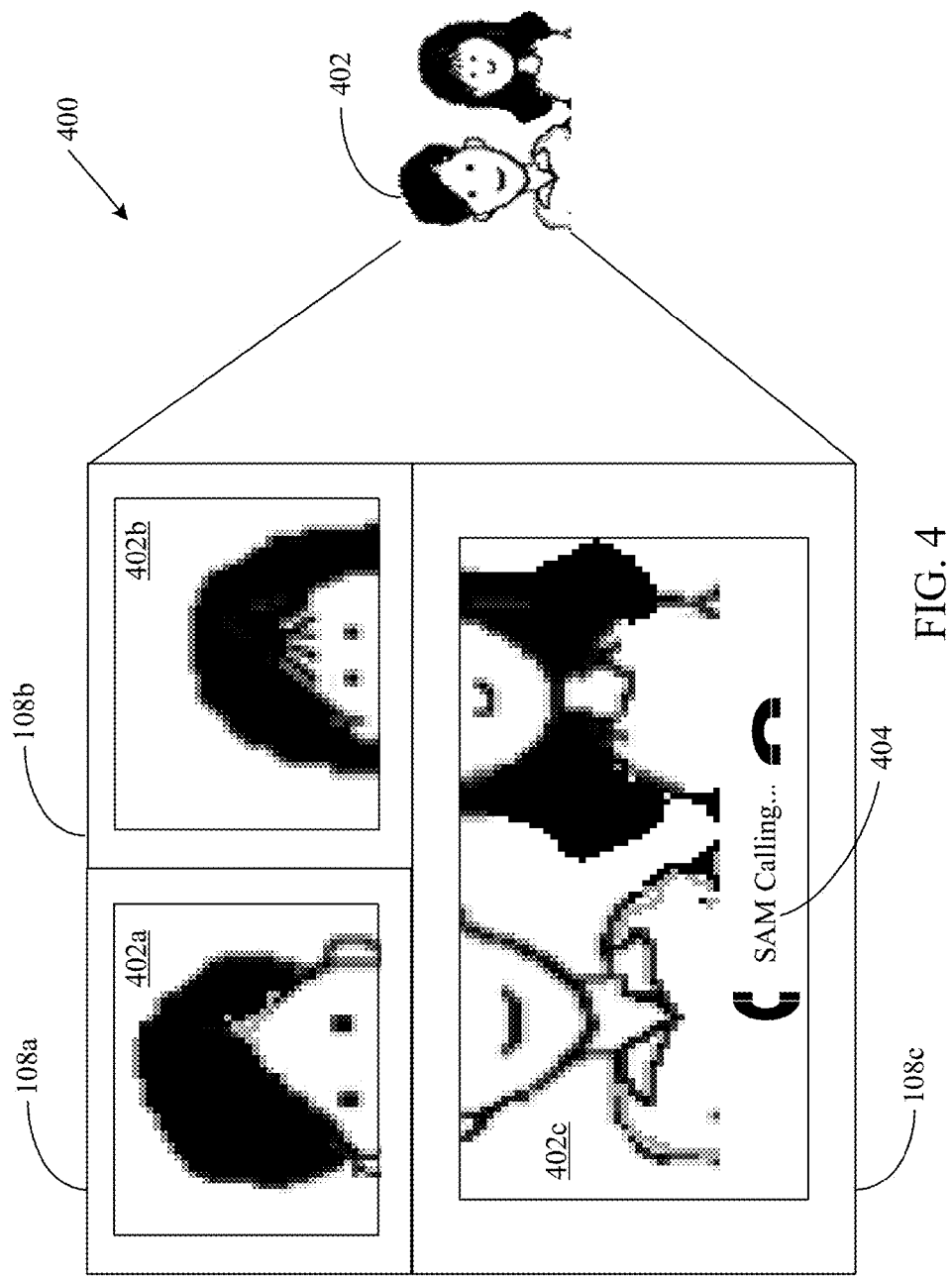
FIGS. 4, 5, 6, 7, and 8 illustrate exemplary scenarios for collaboratively displaying media content on multiple display devices, in accordance with various embodiments of the disclosure.

FIG. 4 illustrates a first example of collaborative rendering of the media content 402, on the display devices 108, in a first collaborative display arrangement 400. A first portion 402a, a second portion 402b, and a third portion 402c of the media content 402 to be collaboratively rendered to the display devices 108, may be determined based on relative position and screen resolution of the display devices 108. Further, a portion of display screen of one or more of the display devices 108 may be assigned to display additional content 404, based on the configuration information and relative position of the display devices 108.

As shown in FIG. 4, the first portion 402a, the second portion 402b, and the third portion 402c of the media content 402 are displayed on the first display device 108a, the second display device 108b, and the third display device 108c, respectively. As a result, the media content 402 may be collaboratively displayed on the display devices 108, in the first collaborative display arrangement 400. Further, FIG. 4 shows that the additional content 404 is displayed on an additional content portion of display screen of the third display device 108c.

Figure 5:
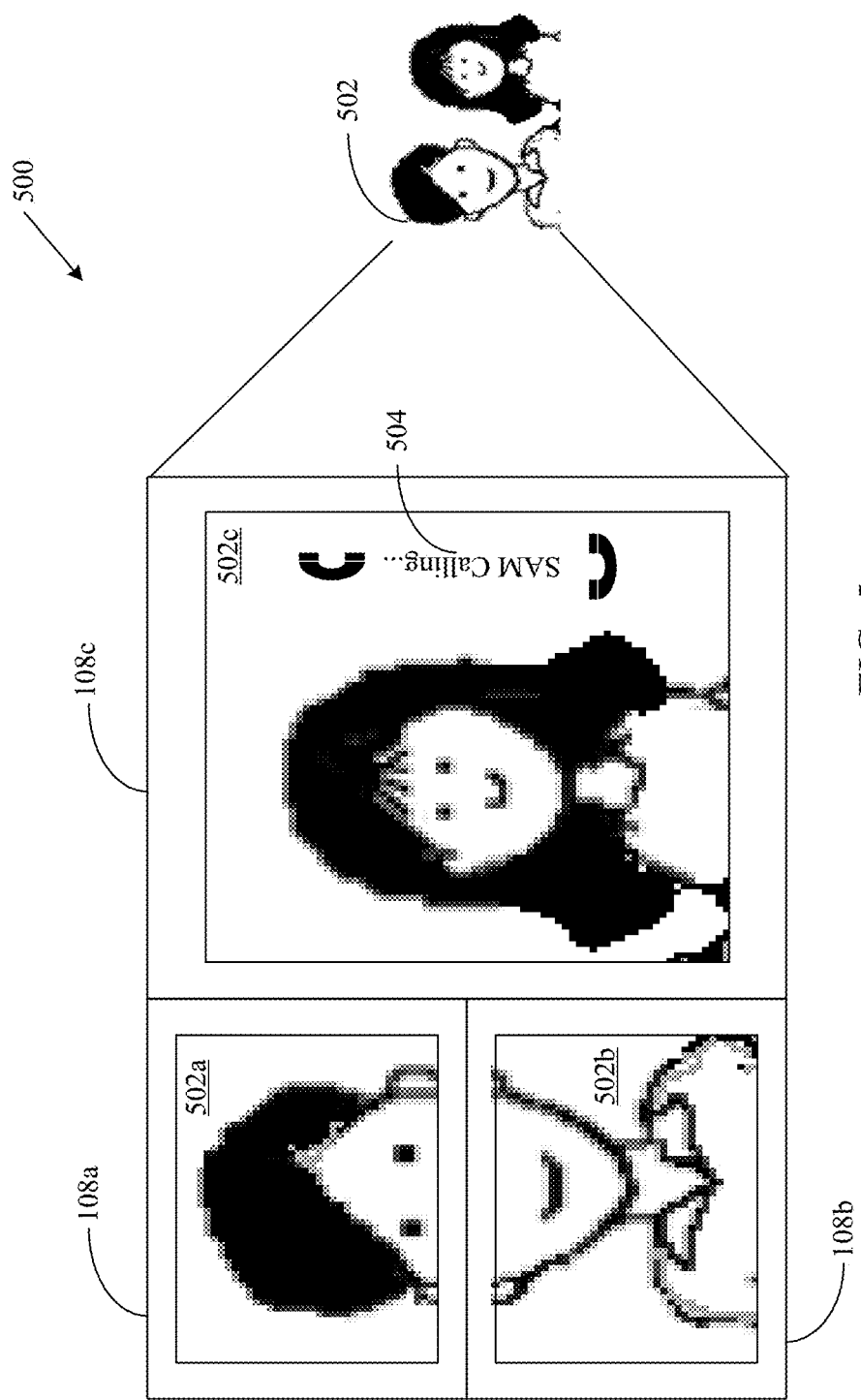

FIG. 5 illustrates a second example of collaborative rendering of media content 502, on the display devices 108 in a second collaborative display arrangement 500. As shown in FIG. 5, the position of the first display device 108a, the second display device 108b, and the third display device 108c, in the second collaborative display arrangement 500, have changed with respect to the first collaborative display arrangement 400. Based on the change in the relative position of the display devices 108, the portion of the media content 502 rendered to each of the first display device 108a, the second display device 108b, and the third display device 108c, has also changed. Further, a portion of the display screen of one or more of the display devices 108 assigned to display additional content 504 is changed based on the changed relative position of the display devices 108.

As shown in FIG. 5, the first portion 502a, the second portion 502b, and the third portion 502c of the media content 502 are displayed on the first display device 108a, the second display device 108b, and the third display device 108c, respectively. As a result, the media content 502 may be collaboratively displayed on the display devices 108 in the second collaborative display arrangement 500. Further, FIG. 5 shows that the additional content 504 is displayed on an additional content portion of display screen of the third display device 108c.

In an embodiment, the additional content 504 may be displayed collectively at the bottom portion of display screen of the first display device 108a, and the second display device 108b.

Figure 6:
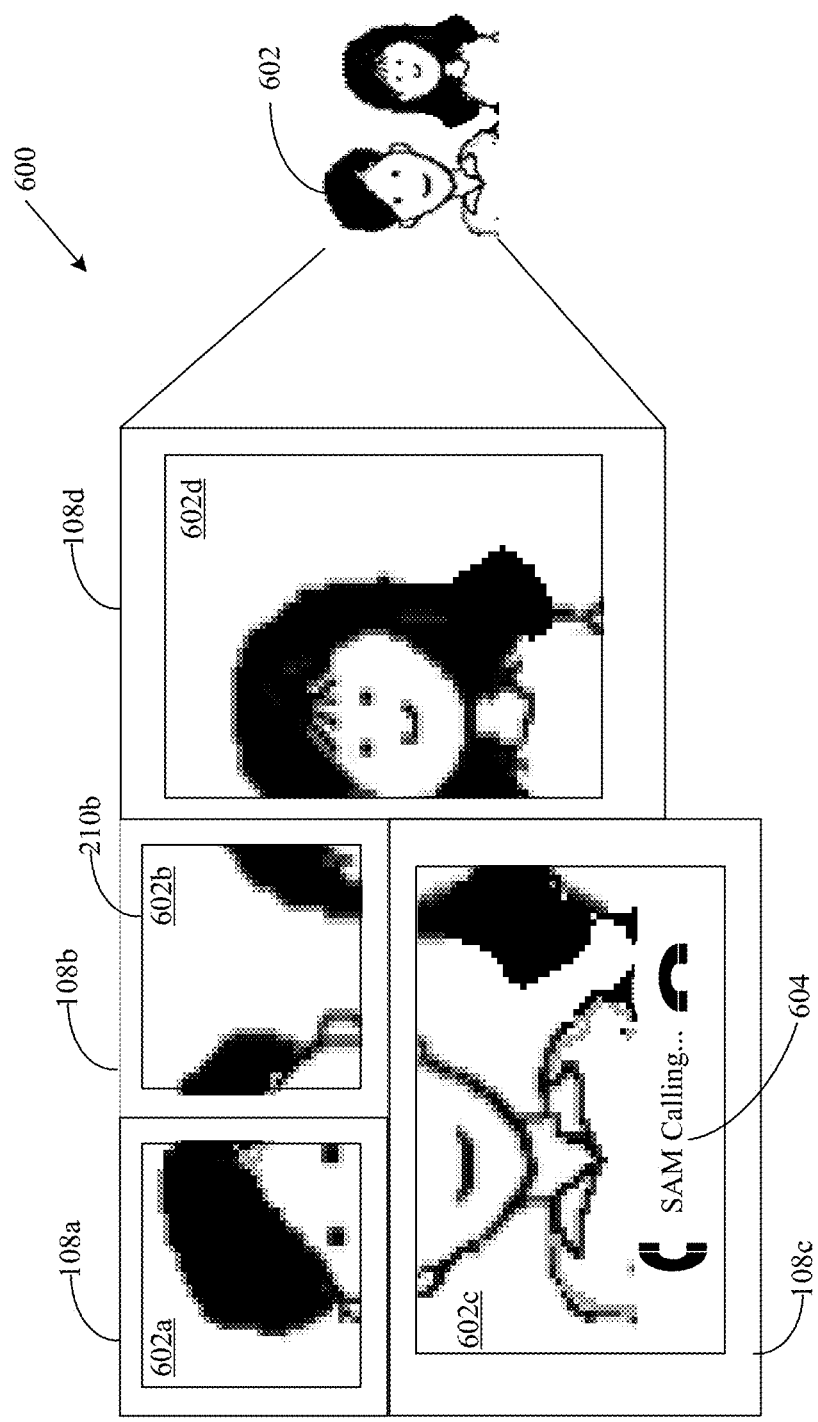

FIG. 6 illustrates a third example of collaborative rendering of the media content 602, on the display devices 108 in a third collaborative display arrangement 600. As shown in FIG. 6, an additional display device 108d is included in the third collaborative display arrangement 600. A first portion 602a, a second portion 602b, a third portion 602c, and a fourth portion 602d, of the media content 602 to be collaboratively rendered to the display devices 108, and the additional display device 108d, may be determined. The first portion 602a, the second portion 602b, the third portion 602c, and the fourth portion 602d may be determined based on the relative position and screen resolution of the display devices 108 and the additional display device 108d in the third collaborative display arrangement 600. Further, a portion of display screen of one of the display devices 108, and/or the additional display device 108d, is assigned to display additional content 604, based on the configuration information and relative position of the display devices 108, and the additional display device 108d.

As shown in FIG. 6, the first portion 602a, the second portion 602b, the third portion 602c, and the fourth portion 602d of the media content 602 are displayed on the first display device 108a, the second display device 108b, the third display device 108c, and the additional display device 108d, respectively. As a result, the media content 602 may be collaboratively displayed on the display devices 108, and the additional display device 108d, in the third collaborative display arrangement 600. Further, FIG. 6 shows that the additional content 604 is displayed on the additional content portion of display screen of the additional display device 108d.

Figure 7:
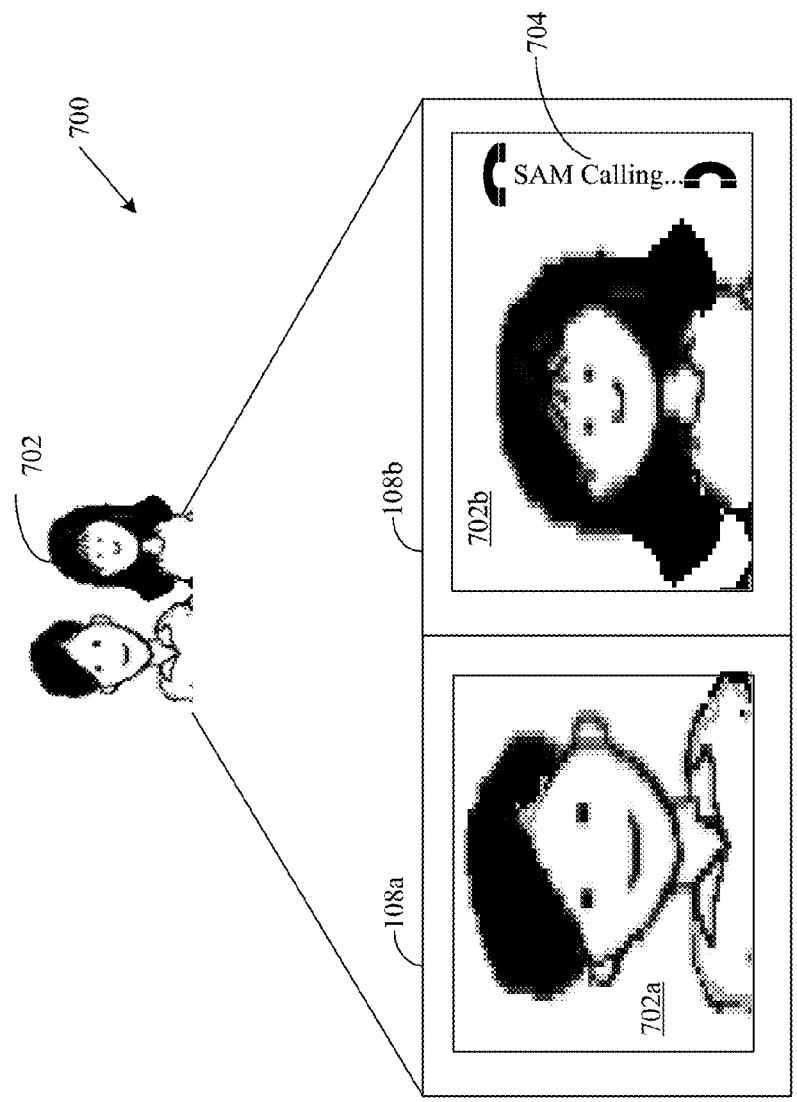

FIG. 7 illustrates a fourth example of collaborative rendering of a media content 702 in a fourth collaborative display arrangement 700. As shown in FIG. 7, the third display device 108c is removed from the fourth collaborative display arrangement 700. A first portion 702a, and a second portion 702b, of the media content 702, to be collaboratively rendered to the first display device 108a, and the second display device 108b, may be determined. The first portion 702a and the second portion 702b may be determined based on the relative position and the screen resolution of the first display device 108a, and the second display device 108b, in the fourth collaborative display arrangement 700. Further, a portion of display screen of one of the first display device 108a, and/or the second display device 108b, is assigned to display additional content 704, based on the configuration information and relative position of the first display device 108a, and the second display device 108b.

As shown in FIG. 7, the first portion 702a, and the second portion 702b, of the media content 702, are displayed on the first display device 108a, and the second display device 108b, respectively. As a result, the media content 702 may be collaboratively displayed on the first display device 108a and the second display device 108b in the fourth collaborative display arrangement 700. Further, FIG. 7 shows that the additional content 704 is displayed on the additional content portion of display screen of the second display device 108b.

Figure 8:
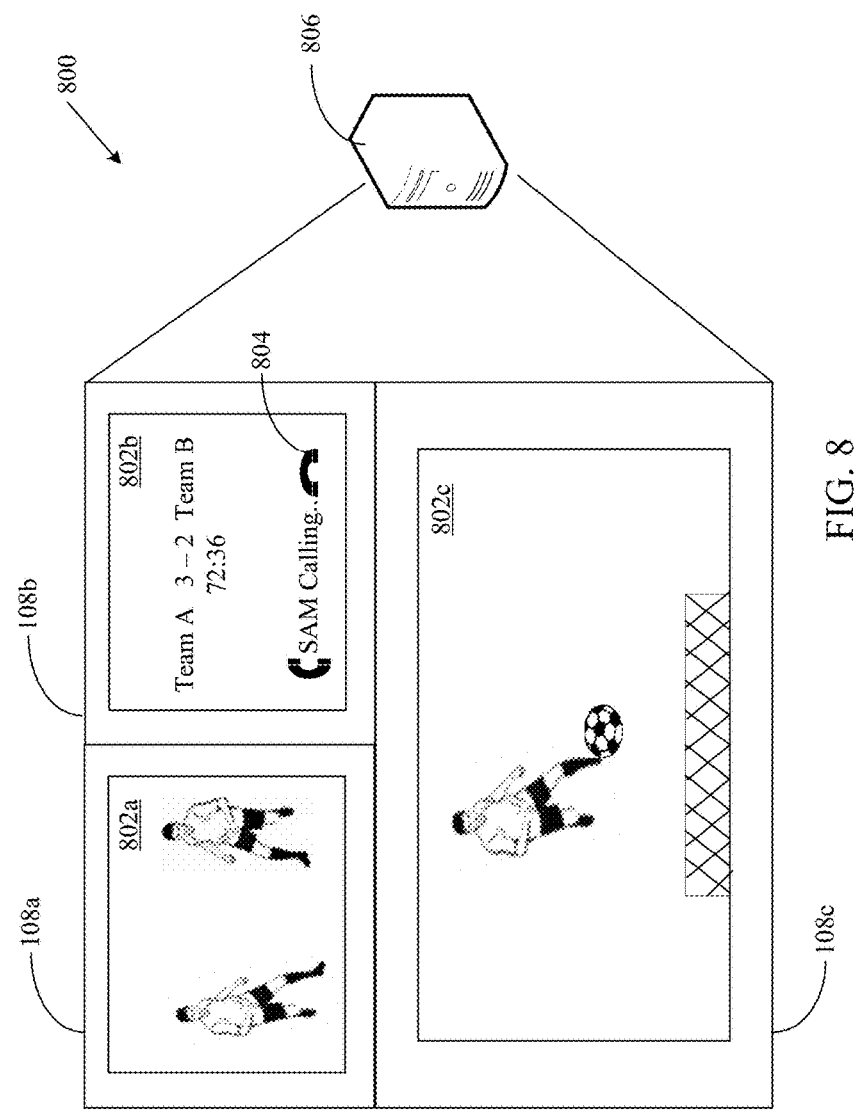

FIG. 8 illustrates collaborative rendering of a multimedia gaming content 802, on the display devices 108, in a fifth collaborative display arrangement 800. FIG. 8 further shows a video gaming console 806, communicatively connected to the display devices 108.

A first screen 802a, a second screen 802b, and a third screen 802c of the multimedia gaming content 802, to be collaboratively rendered to the display devices 108, may be determined based on the relative position and the screen resolution of the respective display devices 108. Further, a portion of display screen of one of the display devices 108 is assigned to display additional content 804, based on the configuration information and relative position of the display devices 108.

The first screen 802a, the second screen 802b, and the third screen 802c of the multimedia gaming content 802, may refer to various screens associated with the multimedia gaming content 802. In an exemplary scenario, the first screen 802a may refer to a field view camera screen. In accordance with the exemplary scenario, the second screen 802b may refer to a screen for showing game statistics, game progress, and various other information associated with the game. Further, in accordance with the exemplary scenario, the third screen 802c may refer to a player's camera screen.

As shown in FIG. 8, the first screen 802a, the second screen 802b, and the third screen 802c, of the multimedia gaming content 802, are displayed on the first display device 108a, the second display device 108b, and the third display device 108c, respectively. As a result, the multimedia gaming content 802 may be collaboratively displayed on the first display device 108a, the second display device 108b, and the third display device 108c, in the fifth collaborative display arrangement 800. Further, FIG. 8 shows that the additional content 804 is displayed on the additional content portion of display screen of the second display device 108b.

Figure 9:
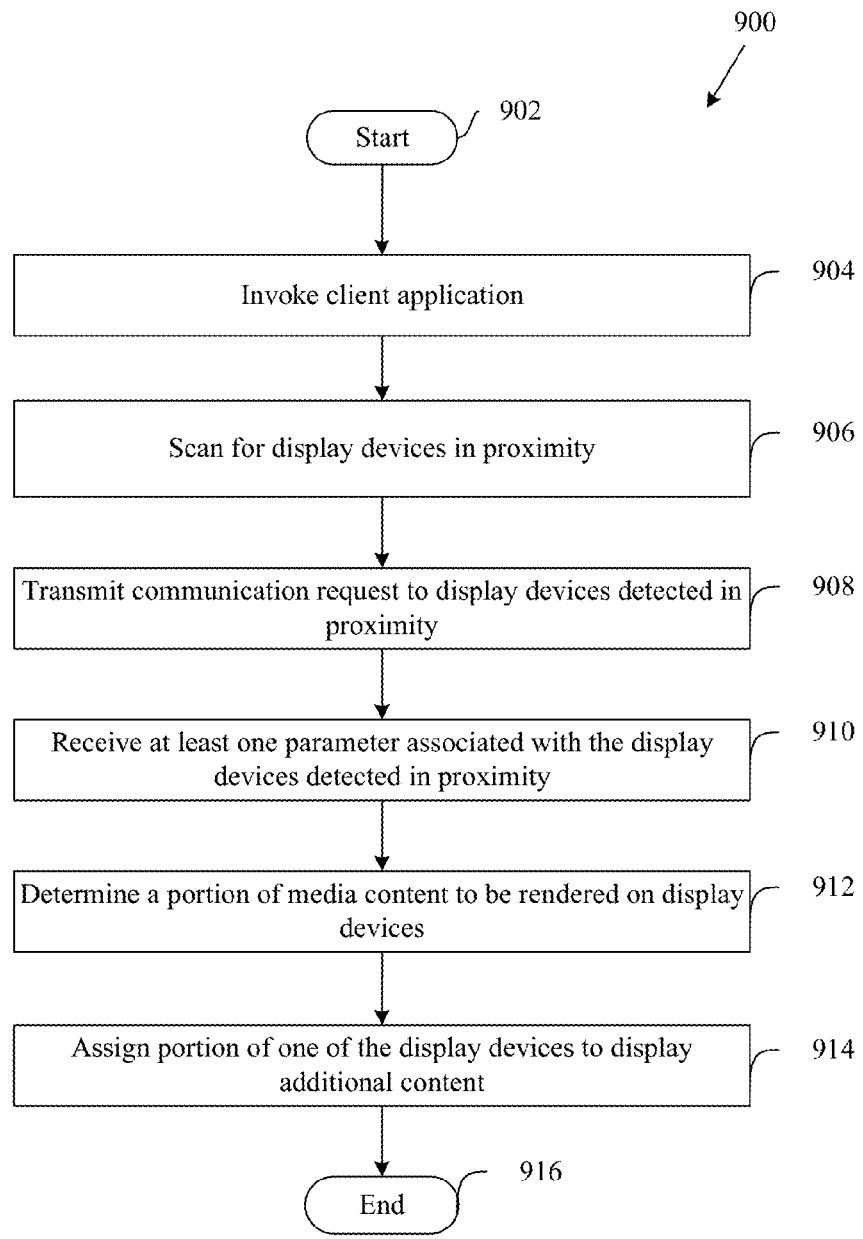
FIG. 9 is a flow chart illustrating a method for collaboratively displaying media content on multiple display devices, in accordance with an embodiment of the disclosure.

FIG. 9 is a flowchart illustrating a method for collaboratively displaying the media content, in accordance with an embodiment of the disclosure. FIG. 9 is described in conjunction with elements of FIG. 1, FIG. 2, and FIG. 3. The method 900 may be implemented in the first display device 108a, communicatively coupled to the second display device 108b, the third display device 108c, the content server 104, and the server computing device 106.

The method 900 begins at step 902. At step 904, the client application 112 may be invoked by the first display device 108a in response to an input received from the user via the input device 212.

At step 906, other display devices in proximity to the first display device 108a may be scanned by the first display device 108a. The second display device 108b and the third display device 108c may be detected by the first display device 108a based on scanning.

At step 908, the communication request to the second display device 108b and the third display device 108c may be transmitted by the first display device 108a.

At step 910, at least one parameter associated with the second display device 108b and the third display device 108c may be received by the first display device 108a.

At step 912, portions of the media content to be displayed on the first display device 108a, the second display device 108b, and the third display device 108c, respectively may be determined by the first display device 108a. The portions of the media content may be determined by the first display device 108a based on the at least one parameter.

At step 914, a portion of one of the display devices 108 may be assigned to display the additional content by the first display device 108a.

In accordance with an embodiment of the disclosure, a system for collaboratively displaying media content may comprise a plurality of display devices, such as display devices 108 (FIG. 1). A first display device 108a (FIG. 1) of the plurality of display devices may comprise a processor, such as the processor 204 (FIG. 2). The processor 204 may be operable to determine a portion of the media content to be displayed by the plurality of display devices, respectively. The portion may be determined based on at least one parameter associated with the plurality of display devices. The processor 204 may be further operable to assign at least a portion of a second display device 108b (FIG. 1) of the plurality of display devices 108 to display additional content. The portion of the second display device 108b may be determined based on at least one parameter associated with the plurality of display devices 108.

The processor 204 may be operable to receive at least one parameter from one or more of the plurality of display devices other than the first display device.

The at least one parameter may comprise one or more of: configuration information of each of one or more of the plurality of display devices 108, relative position of the one or more of the plurality of display devices 108 with respect to the first display device 108*a*, and/or user credential information of one or more accounts associated with the one or more of the plurality of display devices 108.

The processor 204 may be operable to determine the portion of the media content and assign the portion of the second display device 108*b* based on the relative position of the one or more of the plurality of display devices 108 with respect to the first display device 108*a*.

The configuration information may comprise one or more of: display configuration information, residual energy capacity, and/or graphics processing resources. The display configuration information may comprise one or more of screen resolution, supported media formats and/or supported media resolutions.

The processor 204 may be operable to determine one or more common rendering capabilities associated with the plurality of display devices 108 based on the display configuration information of the one or more of the plurality of display devices 108. The processor 204 may be operable to determine one or more quality parameters of the media content to be rendered by the plurality of display devices 108 based on the one or more common rendering capabilities.

The processor 204 may be operable to dynamically determine change in a position of at least one of the plurality of display devices 108 relative to the first display device 108*a*. The processor 204 may be operable to dynamically render the media content to the plurality of display devices 108 based on the determined change in the position.

The processor 204 may be operable to dynamically determine a change in a number of the plurality of display devices 108. The processor 204 may be operable to dynamically render the media content to the plurality of display devices 108 based on the determined change in the number. The processor 204 may be operable to determine the change in the number when one or more of the plurality of display devices 108 are not detected and/or one or more additional display devices other than the plurality of display devices 108 are detected.

The processor 204 may be operable to assign at least a portion of the plurality of display devices 108 to display the additional content. The additional content may comprise one or more of: notifications from one or more accounts associated with at least one of the plurality of display devices, incoming calls on at least one of the plurality of display devices 108, and/or one or more messages received on at least one of the plurality of display devices 108.

In accordance with another embodiment of the disclosure, a system for collaboratively displaying media content may comprise a server computing device 106 (FIG. 1) communicably connected to a plurality of display devices, such as the display devices 108 (FIG. 1). The server computing device 106 may comprise a processor, such as the processor 304 (FIG. 3). The processor 304 may be operable to determine a portion of the media content to be displayed by the plurality of display devices 108. The portion of the media content may be determined based on at least one parameter associated with the plurality of display devices 108. The processor 304 may be further operable to assign at least a portion of one of the plurality of display devices 108, such as the first display device 108*a* (FIG. 1) of the plurality of display devices 108 to display additional content. The portion of the first display device 108*a* may be determined based on at least one parameter associated with the plurality of display devices 108.

The processor 304 may be operable to receive at least one parameter associated with the plurality of display devices 108 from one or more of the plurality of display devices 108. The at least one parameter may comprise one or more of: configuration information of one or more of the plurality of display devices, relative position of one or more of the plurality of display devices, and/or user credential information of one or more accounts associated with the one or more of the plurality of display devices 108.

The processor 304 may be operable to determine the portion of the media content and assign the portion of the first display device 108*a* based on the relative position of the one or more of the plurality of display devices 108.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for collaboratively displaying media content. The at least one code section in a first display device 108*a* may cause the machine and/or computer to perform the steps comprising determining a portion of the media content to be displayed by the plurality of display devices. The portion of the media content may be determined based on at least one parameter associated with the plurality of display devices. At least a portion of a second display device of the plurality of display devices may be assigned to display additional content. The portion of the second display device may be assigned based on the at least one parameter associated with the plurality of display devices.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, comprising:
a plurality of display devices,
wherein a first display device of said plurality of display devices comprises at least one processor, and
wherein said at least one processor is configured to:
determine a portion of media content based on configuration information of said plurality of display devices, wherein said configuration information indicates a residual energy capacity;
control said plurality of display devices to display said determined portion of said media content on each of said plurality of display devices;
assign at least one portion of a display screen of at least one of said plurality of display devices to display additional content, based on said configuration information;
dynamically change said portion of said media content in each of said plurality of display devices based on a change in a position of said at least one of said plurality of display devices, wherein said position is relative to said first display device; and
render said changed portion of said media content to each of said plurality of display devices.

2. The system according to claim 1, wherein said at least one processor is further configured to receive said configuration information from at least one second display device of said plurality of display devices, and wherein said at least one second display device is different from said first display device.

3. The system according to claim 1, wherein said at least one processor is further configured to determine said portion of said media content based on user credential information of at least one account associated with said at least one of said plurality of display devices.

4. The system according to claim 1, wherein said at least one processor is further configured to:
determine said portion of said media content based on said position of said at least one of said plurality of display devices relative to said first display device; and
assign said at least one portion of a second display device of said plurality of display devices based on said position of said at least one of said plurality of display devices.

5. The system according to claim 1, wherein said configuration information of said plurality of display devices further indicates at least one of display configuration information of said plurality of display devices or graphics processing resources of said plurality of display devices.

6. The system according to claim 5, wherein said display configuration information of said plurality of display devices further indicates at least one of a screen resolution, supported media formats, or supported media resolutions.

7. The system according to claim 5, wherein said at least one processor is further configured to determine at least one common rendering capability associated with said plurality of display devices, based on said display configuration information of said plurality of display devices, and wherein said at least one common rendering capability comprises at least one of file formats, a screen resolution, or a media content resolution supported by each of said plurality of display devices.

8. The system according to claim 7, wherein said at least one processor is further configured to:
determine at least one quality parameter of said media content based on said at least one common rendering capability,
wherein said at least one quality parameter comprises at least one of a file format of said media content or a resolution of said media content; and
render said at least one quality parameter to said plurality of display devices.

9. The system according to claim 1, wherein said at least one processor is further configured to dynamically determine said change in said position of said at least one of said plurality of display devices, and wherein said position is relative to said first display device.

10. The system according to claim 1, wherein said at least one processor is further configured to:
dynamically determine a change from a first number of said plurality of display devices to a second number of said plurality of display devices; and
dynamically render said media content to said second number of said plurality of display devices based on said determined change from said first number of said plurality of display devices to said second number of said plurality of display devices.

11. The system according to claim 10, wherein said at least one processor is further configured to determine said change from said first number to said second number based on at least one of a determination that said at least one of said plurality of display devices is undetected or a detection of at least one additional display device different from said plurality of display devices.

12. The system according to claim 1, wherein said additional content comprises at least one of notifications from at least one account associated with said at least one of said plurality of display devices, incoming calls on said at least one of said plurality of display devices, or at least one message received on said at least one of said plurality of display devices.

13. The system according to claim 1,
wherein said additional content is displayed along with a corresponding portion of said media content, and
wherein said at least one processor is further configured to dynamically change said portion of said media content based on a determination that said additional content is displayed.

14. The system according to claim 1, wherein said at least one processor is further configured to designate one of said plurality of display devices as a master device based on comparison of said configuration information of each of said plurality of display devices.

15. A system, comprising:
a plurality of display devices; and
a server computing device communicably connected to said plurality of display devices,
wherein said server computing device comprises at least one processor configured to:
determine a portion of media content based on configuration information of said plurality of display devices, wherein said configuration information indicates a residual energy capacity;
control said plurality of display devices to display said determined portion of said media content on each of said plurality of display devices;

assign at least one portion of a display screen of at least one of said plurality of display devices to display additional content, based on said configuration information;

dynamically change said portion of said media content in each of said plurality of display devices based on a change in a relative position of said at least one of said plurality of display devices: and render said changed portion of said media content to each of said plurality of display devices.

16. The system according to claim 15, wherein said at least one processor is further configured to receive said configuration information from said plurality of display devices.

17. The system according to claim 15, wherein said at least one processor is further configured to determine said portion of said media content based on user credential information of at least one account associated with said at least one of said plurality of display devices.

18. The system according to claim 15, wherein said at least one processor is further configured to:

determine said portion of said media content based on said relative position of said at least one of said plurality of display devices; and assign said at least one portion of said plurality of display devices based on said relative position of said at least one of said plurality of display devices.

19. A method, comprising:

in a display device of a plurality of display devices:

determining a portion of media content based on configuration information of said plurality of display devices, wherein said configuration information indicates a residual energy capacity;

controlling said plurality of display devices to display said determined portion of said media content on each of said plurality of display devices;

assigning at least one portion of a display screen of at least one of said plurality of display devices to display additional content, based on said configuration information;

dynamically changing said portion of said media content in each of said plurality of display devices based on a change in a position of said at least one of said plurality of display devices, wherein said position is relative to said display device; and rendering said changed portion of said media content to each of said plurality of display devices.

20. A method, comprising:

in a computing device communicably connected to a plurality of display devices:

determining a portion of media content based on configuration information of said plurality of display devices, wherein said configuration information indicates a residual energy capacity;

controlling said plurality of display devices to display said determined portion of said media content on each of said plurality of display devices;

assigning at least one portion of a display screen of at least one of said plurality of display devices to display additional content, based on said configuration information;

dynamically changing said portion of said media content in each of said plurality of display devices based on a change in a relative position of said at least one of said plurality of display devices; and rendering said changed portion of said media content to each of said plurality of display devices.

21. A method, comprising:

in a first display device of a plurality of display devices:

determining a portion of media content based on configuration information of said plurality of display devices, wherein said configuration information indicated a residual energy capacity;

controlling said plurality of display devices to display said determined portion of said media content on each of said plurality of display devices;

assigning at least a portion of a display screen of said first display device for display of additional content, based on said configuration information;

dynamically determining a change in a position of at least one of said plurality of display devices, wherein said position is relative to said first display device;

dynamically changing said portion of said media content in each of said plurality of display devices based on said determined change in said position; and dynamically rendering said changed portion of said media content to each of said plurality of display devices.

22. The method according to claim 21, further comprising assigning a portion of a second display device of said plurality of display devices to display said additional content based on said determined change in said position.

* * * * *